(12) United States Patent
Altman et al.

(10) Patent No.: US 12,039,267 B2
(45) Date of Patent: Jul. 16, 2024

(54) AUTOMATED CATEGORIZATION OF DATA BY GENERATING UNITY AND RELIABILITY METRICS

(71) Applicant: INTUIT INC., Mountain View, CA (US)

(72) Inventors: Noah Eyal Altman, Rishon Le'Zion (IL); Yair Horesh, Kfar-Saba (IL); Yaakov Tayeb, Tzur Hadasa (IL)

(73) Assignee: INTUIT INC., Mountain View, CA (US)

( * ) Notice: Subject to any disclaimer, the term of this patent is extended or adjusted under 35 U.S.C. 154(b) by 469 days.

(21) Appl. No.: 17/490,451

(22) Filed: Sep. 30, 2021

(65) Prior Publication Data

US 2023/0098522 A1 Mar. 30, 2023

(51) Int. Cl.
*G06F 40/279* (2020.01)
*G06F 16/35* (2019.01)
*G06Q 30/0201* (2023.01)
*G06Q 40/02* (2023.01)
*G06Q 40/12* (2023.01)

(52) U.S. Cl.
CPC .......... *G06F 40/279* (2020.01); *G06F 16/353* (2019.01); *G06Q 30/0201* (2013.01); *G06Q 40/02* (2013.01); *G06Q 40/12* (2013.12)

(58) Field of Classification Search
CPC .... G06Q 40/12; G06Q 30/0201; G06Q 40/02; G06F 16/353; G06F 40/279; G06F 16/00; G06F 40/00
See application file for complete search history.

(56) References Cited

U.S. PATENT DOCUMENTS

| 10,388,272 | B1* | 8/2019 | Thomson | G10L 15/22 |
| 11,176,152 | B2* | 11/2021 | Torrenegra | G06Q 30/02 |
| 11,514,349 | B1* | 11/2022 | Rei | G06N 7/01 |
| 2012/0296699 | A1* | 11/2012 | Richardson | G06Q 30/0201 |
| | | | | 705/7.31 |
| 2016/0104480 | A1* | 4/2016 | Sharifi | G10L 17/22 |
| | | | | 704/254 |
| 2018/0114136 | A1* | 4/2018 | Kumar | G06F 16/9035 |
| 2018/0336183 | A1* | 11/2018 | Lee | G06N 5/022 |
| 2020/0202372 | A1* | 6/2020 | Deshong | G06Q 30/02 |
| 2021/0073287 | A1* | 3/2021 | Hunter | H04L 63/123 |

(Continued)

*Primary Examiner* — Michael Colucci
(74) *Attorney, Agent, or Firm* — Patterson + Sheridan, LLP

(57) ABSTRACT

Certain aspects of the present disclosure provide techniques for generating a metric, include receiving a rule defining one or more text strings; determining a set of transactions based on a user attribute; determining a first subset of transactions; determining a second subset of transactions; generating a first categorical distribution based on each transaction of the first subset of transactions being associated with a transaction description containing at least one text string of the one or more text strings; calculating a first unity metric based on the first categorical distribution; generating a second categorical distribution based on each transaction of the second subset of transactions being associated with a transaction description that does not contain a text string of the one or more text strings; calculating a second unity metric based on the second categorical distribution; determining a reliability metric for the rule; and providing the reliability metric.

20 Claims, 6 Drawing Sheets

(56) References Cited

U.S. PATENT DOCUMENTS

| | | | |
|---|---|---|---|
| 2022/0067288 A1* | 3/2022 | Goodsitt | G06F 40/295 |
| 2022/0076279 A1* | 3/2022 | Renaud | G06Q 30/02 |
| 2022/0300651 A1* | 9/2022 | Mondal | G06F 21/6254 |
| 2023/0099588 A1* | 3/2023 | Zhou | G06F 16/90335 |
| | | | 707/765 |

* cited by examiner

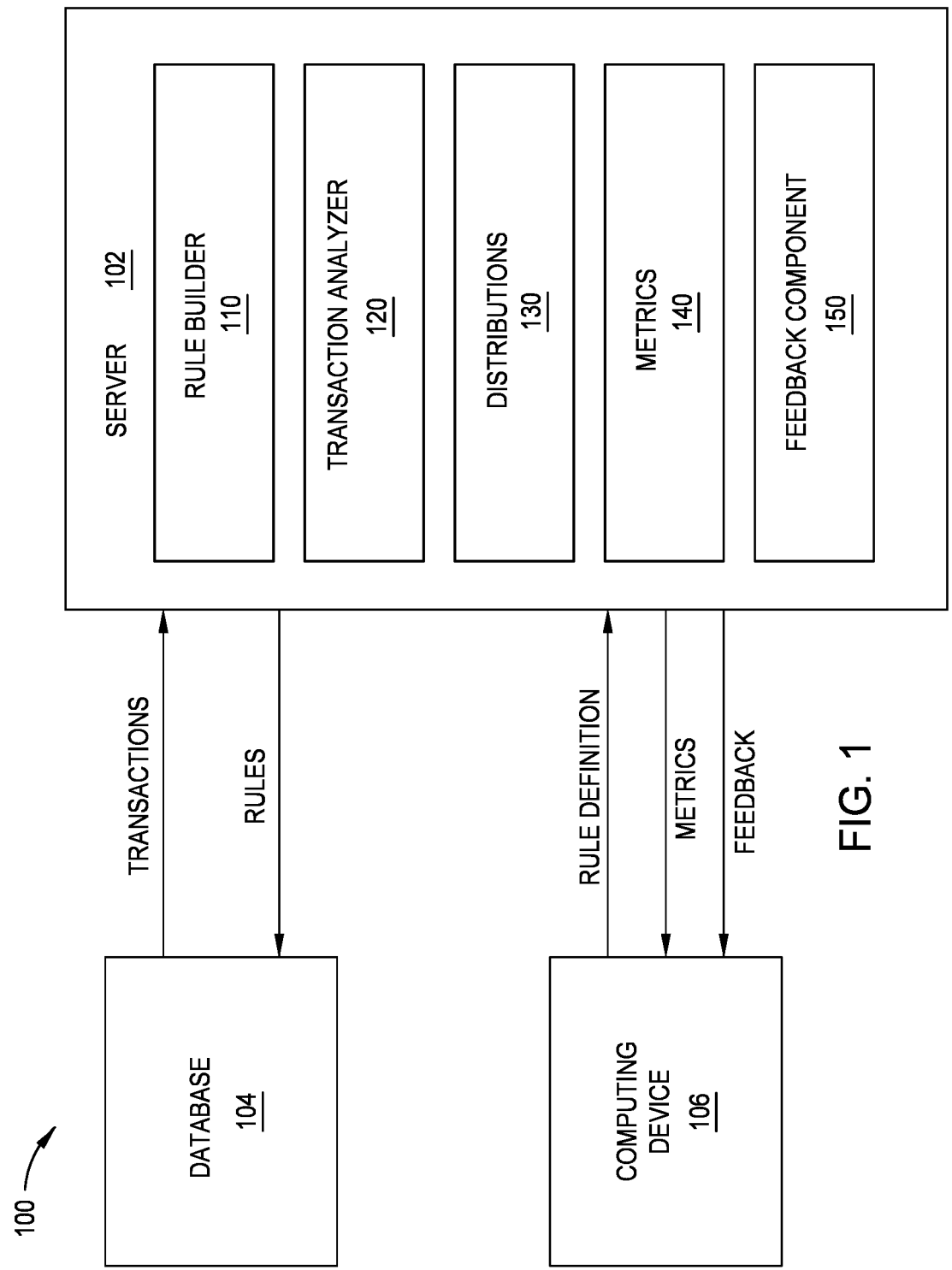

AUTOMATED CATEGORIZATION OF DATA BY GENERATING UNITY AND RELIABILITY METRICS

INTRODUCTION

Aspects of the present disclosure relate to automated categorization of data through categorical distributions and rule metrics.

Automatically categorizing data is a difficult task due to inherent complexities in the data that conventional categorization processes do not handle. For example, when automatically categorizing transactions records, a conventional process may incorrectly categorize transactions including unexpected data. Consequently, conventional categorization processes require a human to update incorrect categorizations (e.g., manually).

Because of the inherent complexity in automatic categorization of data, conventional methods require a significant amount of time and/or processing resources. Further, when manual intervention is required to correct erroneous categorizations, it becomes completely impractical to process any large volume of data.

Accordingly, there is a need for improved methods of automatically categorizing data.

BRIEF SUMMARY

Certain embodiments provide a method. The method generally includes receiving a rule for categorizing transactions defining one or more text strings; determining a set of transactions based on a user attribute associated with the rule; determining a first subset of transactions, wherein each transaction of the first subset of transactions is associated with a transaction description that contains at least one text string of the one or more text strings; determining a second subset of transactions, wherein each transaction of the second subset of transactions is associated with a transaction description that does not contain a text string of the one or more text strings; generating a first categorical distribution of the first subset of transactions based on each transaction of the first subset of transactions being associated with a transaction description that contains at least one text string of the one or more text strings; calculating a first unity metric based on the first categorical distribution; generating a second categorical distribution of the second subset of transactions based on each transaction of the second subset of transactions being associated with a transaction description that does not contain a text string of the one or more text strings; calculating a second unity metric based on the second categorical distribution; determining a reliability metric for the rule based on the first unity metric and the second unity metric; and providing the reliability metric to an associated device.

Other embodiments provide processing systems configured to perform the aforementioned method as well as those described here; non-transitory, computer-readable media comprising instructions that, when executed by one or more processors of a processing system, cause the processing system to perform the aforementioned method as well as those described here; a computer program product embodied on a computer-readable storage medium comprising code for performing the aforementioned method as well as those further described here; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 1 depicts an example computing environment for generating one or more categorical distributions and metrics for a rule.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 2A:
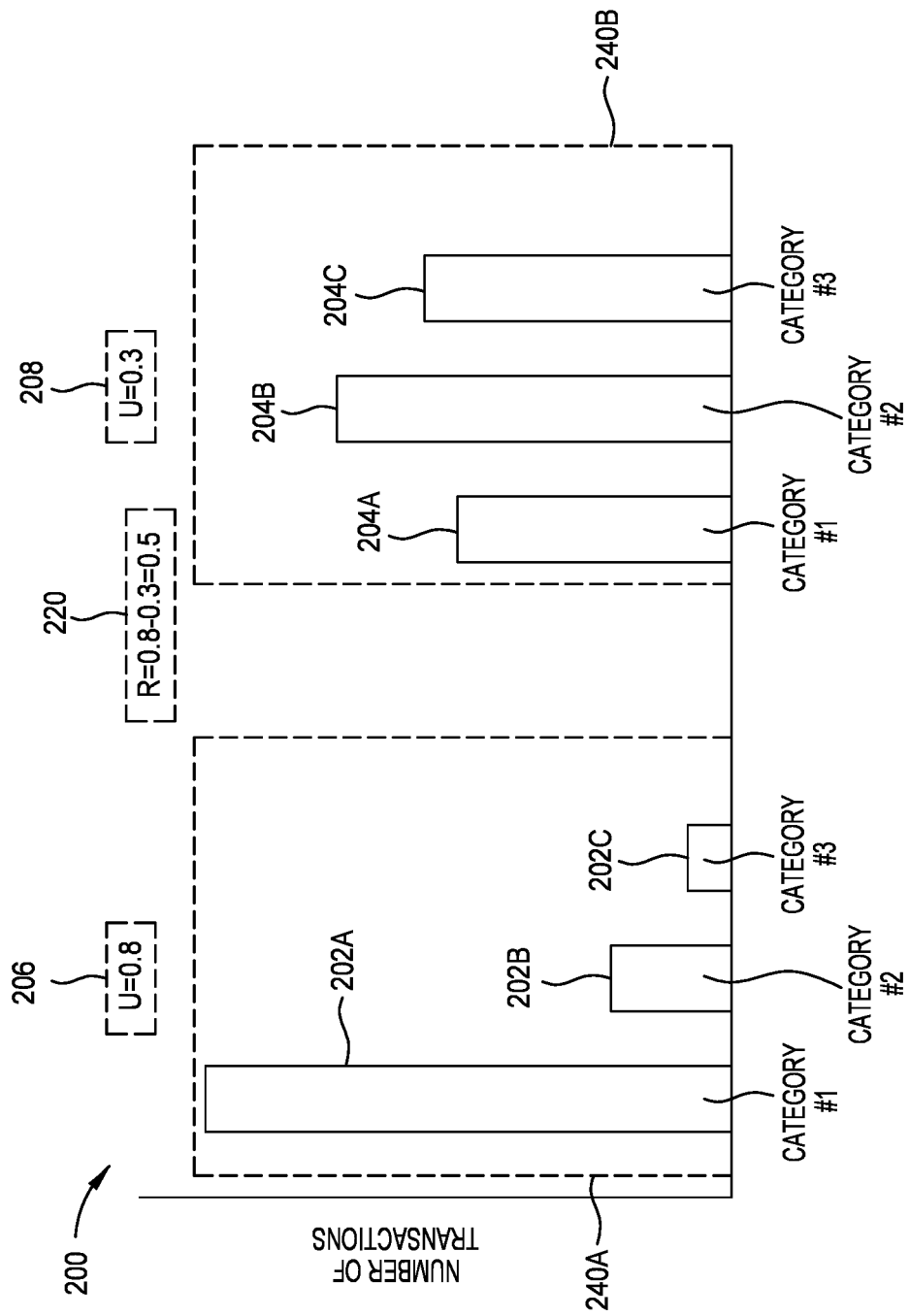
FIGS. 2A and 2B depict example categorical distributions and unity metrics for one or more rules.

Aspects of the present disclosure provide apparatuses, methods, processing systems, and non-transitory, computer-readable mediums for generating reliability metrics indicating a reliability of a rule for categorizing transactions based on categorical distributions created when implementing the rule across a set of transactions.

The modern data-driven economy generates an incredible amount of transactions every day. Conventional methods of processing such data simply are not up to the task of trying to, for example, categorize all of the transactions in a meaningful way so that it can be used to generate information and drive other processes. Moreover, such a task is entirely beyond the capacity of any sort of mental process performed by a human because the volume of data and complexity is simply too staggering.

A fundamental approach to categorizing data (e.g., transactions) is to generate a rule that categorizes the data based on characteristics of the data. For example, a rule may be created that categorizes all transactions associated with "Company X" into a first category and cause those transactions to be placed into a first account associated with first category. Similarly, another rule may categorize all transactions associated with "Company Y" into a second category and cause those transactions to be placed into a second account associated with the second category. The rules may be based on, for example, one or more text strings, such as "Company X Ltd." and "Company Y Ltd.", so that if one of those text strings appears in a transaction description associated, the associated transaction is then categorized based on the text string.

However, a conventional rules-based approach may not always categorize the transactions as intended when complexity is induced by the transaction data. Referring back to the previous example, if Company X transacts with Company Y, then a transaction between them may include "Company X Ltd." and "Company Y Ltd." In the transaction data, which effectively breaks the logic of the rules and may lead to unintended and/or miscategorizations. Conventional rules-based approaches may suffer more generally from overly broad and/or overly narrow rules that cause resulting categorizations to not meet the intent of the rules.

In order to overcome these challenges, embodiments herein describe an automated approach for scoring rules based on categorical distributions of transactions generated based on applying the rules. In various embodiments, the created rules can be tested on a set of transactions before implementing the rule in order to determine how well the rule categorizes transactions, which allows a categorical distribution of that set of transactions to be generated. In general, a categorical distribution places each transaction of the set of transactions in a category as well as lists the number of transactions from the set of transactions that were placed in each category. A unity metric indicating how the transactions were categorized, such as based on whether similar numbers of transactions were placed in each category or one category had a larger number of transactions placed in it, may be generated based on the categorical distribution. For example, a unity metric may be a numerical value that indicates an extent to which the transactions were uniformly categorized. The unity metric may then be used to determine whether the rule should be used and/or to further generate other metrics, such as a reliability metric that can help determine whether the rule should be used. In some cases, more than one unity metric may be generated, such as a unity metric for transactions that match the rule and a unity metric for transactions that do not match the rule. Additionally, the reliability metric may indicate how well the rule categorizes transactions overall based on the unity metrics, and thus also indicate if the rule is ready to be used or if the rule requires an adjustment. The reliability metric may also be provided with feedback indicating how well the rule categorized the transactions as well as suggestions for how to improve the rule.

Unity metrics described herein may be indicative of the reliability of a given rule because the unity metrics show whether the rule categorizes transactions with similar attributes in the same category or across multiple categories, and thus indicates if the rule will be helpful as an organization tool of the transactions, since a high unity metric may show that transactions that have similar attributes and match the rule were able to be well-organized using one category while a low unity metric shows that the transactions that have similar attributes and match the rule were not able to be organized into that category. Therefore, when regarding transactions that match the rule, a high unity metric indicates that the rule effectively organizes those transactions.

Similarly, when regarding transactions that do not match the rule, a high unity metric indicates that the process used to organize those transactions is also effective, while a low unity metric indicates that the process is not effective. Thus, the reliability metric may be determined based on the unity metrics for the categorical distributions for both the unmatched and the matched transactions in order to show how effectively the rule organizes transactions in view of other processes. For example, a high unity metric associated with the categorical distribution for matched transactions and a low unity metric associated with the categorical distribution of unmatched transactions may lead to a high reliability metric because the rule effectively organizes matched transactions while another process is not effectively organizing the unmatched transactions. As another example, a low unity metric associated with the categorical distribution for matched transactions and a high unity metric associated with the categorical distribution of unmatched transactions may lead to a low reliability metric because the rule is not effectively organizing matched transactions while another process is effectively organizing the unmatched transactions.

Beneficially, by generating the unity metrics and reliability metrics, the embodiments described herein allow for a more efficient way to design effective rules as well as increased effectiveness of the rules, and therefore, allow transactions to be categorized more efficiently and effectively as well. For example, before a user begins implementing a rule, he or she tests that rule to generate the categorical distributions and resulting metrics, which indicate the quality of the rule and thus show if the rule needs to be further refined in order to avoid improper categorizations. Thus, the metrics allow for the effectiveness of the rule to be increased by avoiding those improper categorizations, and additionally, with no improper categorizations, no extra processing steps are needed. Thus, the embodiments described herein allow for more efficient designing of rules as well as increased effectiveness of those rules.

Example System for Generating a Reliability Metric

FIG. 1 depicts an example system 100 for generating a reliability metric for one or more categorization rules.

As illustrated, the system 100 includes a server 102 interacting with a database 104 and a computing device 106. The server 102 is configured for communication with the database 104 and may receive one or more transactions from the database 104, and may further send one or more rules to the database 104. The transactions received from the database 104 may be historical transactions containing transaction descriptions associated with past transactions. Additionally, the server 102 may be in communication with the computing device 106, and may receive rule definitions from the computing device 106, and may further send metrics and feedback about rules created from the rule definitions to the computing device 106. In other embodiments, database 104 may be stored on server 102.

The rule definition received at server 102 may define a rule that categorizes transactions, for example, based on transaction descriptions or other attributes of the transactions. For example, the rule definition may define a search text string, and the server may categorize the transactions based on whether the text string was within the transaction descriptions. As another example, the rule definition may define a regular expression that indicates one or more patterns of characters, and the server 102 may categorize the transactions based on whether the transaction descriptions contain characters in those one or more patterns.

In this depicted example, server 102 further includes rule builder 110, transaction analyzer 120, distributions 130, metrics 140, and feedback component 150. Rule builder 110 builds rules based on received rule definitions and may further be used to adjust those rules based on feedback associated with those rules. Transaction analyzer 120 analyzes one or more transactions in a set of transactions based on rules built by rule builder 110 and further generates one or more categorical distributions, unity metrics, and/or reliability metrics. Distributions 130 stores the categorical distributions generated by transaction analyzer 120 while metrics 140 stores the unity metrics and reliability metrics generated by transaction analyzer 120.

By using the rule builder 110 and transaction analyzer 120, the server 102 may receive a rule definition, build a rule for categorizing transactions, receive a set of transaction to test the rule on, and generate a reliability metric indicating whether the rule reliably categorizes the transactions correctly. Thus, when receiving a rule definition as input, the server may output a reliability metric indicating whether the rule performs well.

In this depicted embodiment, the rule builder 110 receives the rule definitions and builds the rules for categorization transactions based on the rule definitions. The rule builder 110 may further store the built rules, which may be referenced by the server 102 when receiving new rule definitions. In some embodiments, the rule builder 110 may receive the rule instead of the rule definition. A rule may include computer programming logic that may be used to process certain transactions. For example, a rule may define one or more text strings that may be present in one or more transaction descriptions. A rule may further define a certain transaction amount that may be associated with the processed transactions. A rule may also define certain parties that may be associated with certain transactions. Based on the text strings, amounts, parties, or other attributes that the rule defines, the server 102 may categorize the transactions (e.g., through transaction analyzer 120). While text strings, amounts, and parties are described as attributes of transactions, those attributes are exemplary, and other attributes may be used.

Transaction analyzer 120 may use the rules created by rule builder 110 in order to categorize the transactions received from database 104. The transaction analyzer 120 may execute the rule in order to process the transactions received from database 104. For example, the transaction analyzer 120 may implement a rule defining that transactions with transaction descriptions containing a first text string are put into a first category, where those with transaction descriptions containing a second text string may be put into a second category, and those with transaction descriptions containing a third text string may be put into a third category. Thus, in that example, when executing the rule, the transaction analyzer 120 analyzes the transaction descriptions based on the rule and deposits each transaction into one of the categories based on that analysis. Additionally, the examples described are used for simplicity, and the logic defined in the rules can be much more complex (e.g., by including multiple dependencies).

In some embodiments, transaction analyzer 120 may determine the set of transactions on which to apply the rule based on one or more attributes that are the same or similar between the transactions in the set of transactions. For example, the set of transactions may include historical transactions that share one or more of an associated industry, zip code, or similar chart-of-accounts. The set of transactions may also include transactions that are associated with an amount within a certain range. Additionally, the server 102 may receive a plurality of transactions and may determine the set of transactions from the plurality of transactions based on the same or similar attributes of each transaction in the set of transactions. In one embodiment, the server 102 may receive the set of transactions without determining which transactions share the same or similar attributes.

For each rule that the transaction analyzer 120 executes for a set of transactions from database 104, the transaction analyzer 120 may create one or more categorical distributions of transactions with regards to the categories that the transactions are placed in. For example, based on analyzing the rule, the transaction analyzer 120 may determine that a first amount of transactions contained the first text string, and may place the first amount of transactions into the first category. The transaction analyzer 120 may further determine a second amount of transactions containing the second text string, and a third amount of transactions containing the third text string, and place the second and third amounts of transactions in their respective categories. Thus, each transaction that contained one of the three text strings defined by the rule may be considered a "matched" transaction. A categorical distribution of each "matched" transaction to the categories may be created and used in determining a metric for the categorical distribution, as further described with respect to FIGS. 2A-2B and 3A-3B.

Additionally, the transaction analyzer 120 may further analyze the remaining transactions in the set of transactions that do not contain one of the three text strings. Each of the transactions that do not contain one of the three text strings may be considered an "unmatched" transaction, and the transaction analyzer 120 may place each of the unmatched transactions into one of the three categories based on other analysis methods. The transaction analyzer may further create a categorical distribution of each unmatched transaction to the categories, which may also be used in determining unity metrics and reliability metrics, as further described with respect to FIGS. 2A-2B and 3A-3B.

In this depicted example, distributions 130 stores each of the categorical distributions created by transaction analyzer 120, where each categorical distribution is associated with at least one rule and the set of transactions is associated with the at least one rule. Transaction analyzer 120 may further use the categorical distributions of distributions 130 in determining one or more unity metrics and/or a final reliability metric for a rule, as described below with respect to FIGS. 2A-2B and 3A-3B. The categorical distributions of distributions 130 may also be used later when comparing similar rules and their reliabilities.

Metrics 140 includes metrics determined by transaction analyzer 120. Metrics 140 may include both metrics associated with a particular categorical distribution, such as a "unity" metric, as well as metrics associated with the reliability of a rule built by rule builder 110, such as a "reliability" metric. In some embodiments, the reliability metric for a rule is calculated based on one or more of the unity metrics for the matched categorical distribution and the unmatched categorical distribution for that rule.

In this depicted embodiment, feedback component 150 creates feedback to be provided regarding one or more rules built by rule builder 110 based on the analysis of transaction analyzer 120, distributions 130, and metrics 140. Further, in this depicted embodiment, the feedback may be provided to the computing device 106.

For example, as described above, a unity metric created for a categorical distribution may indicate how transactions are categorized (e.g., a high unity metric, such as "1", indicating that the transactions were all or mostly placed in one category, and a low unity metric, such as "0", indicating that the transactions were evenly or relatively evenly distributed). Thus, if a matched categorical distribution for a rule has a high unity metric and an unmatched categorical distribution for the same rule has a low unity metric, the feedback component 150 may provide feedback to the computing device 106 indicating that matched transactions are effectively categorized by the rule, but that the unmatched transactions were not effectively categorized by the transaction analyzer 120, and thus, another rule could be defined in order to effectively categorize the transactions that did not match this rule. As another example, if a matched categorical distribution for a rule has a low unity metric and an unmatched categorical distribution for the same rule has a high unity metric, the feedback component 150 may provide feedback to the computing device 106 indicating that matched transactions are not effectively categorized by the rule, but that the transaction analyzer 120 was effectively categorizing the unmatched transactions, and thus, implementing another rule that would effectively categorize the transactions should be considered. Additionally, if a rule was associated with a high or low reliability metric, the feedback component 150 may provide feedback that the rule was overall effectively or not effectively categorizing all transactions, respectively.

In some embodiments, the feedback component 150 may only provide distributions 130 (e.g., categorical distributions) and/or metrics 140 as feedback to the computing device 106. In some cases, the feedback component 150 may also provide visual representations of the categorical distributions.

The server may further remove personally identifiable information from transaction descriptions associated with transactions. Personally identifiable information may include sensitive information specific to an individual or a group of people. As the server may identify and remove personally identifiable information as it analyzes transactions and may remove the personally identifiable information in order to improve performance. In some embodiments, if the defined text strings include personally identifiable information, the personally identifiable information will not be removed from the transaction descriptions.

Thus, by building and implementing a rule for categorizing the transactions, the server 102 may create categorical distributions for the rule and calculate one or more metrics indicating if the rule will effectively categorize transactions. The server 102 can additionally provide feedback on the effectiveness of the rule (e.g., to computing device 106) so that a user may choose to edit the rule definition or define other rules to categorize the transactions.

Example Matched and Unmatched Categorical Distributions for a Rule

Figure 2B:
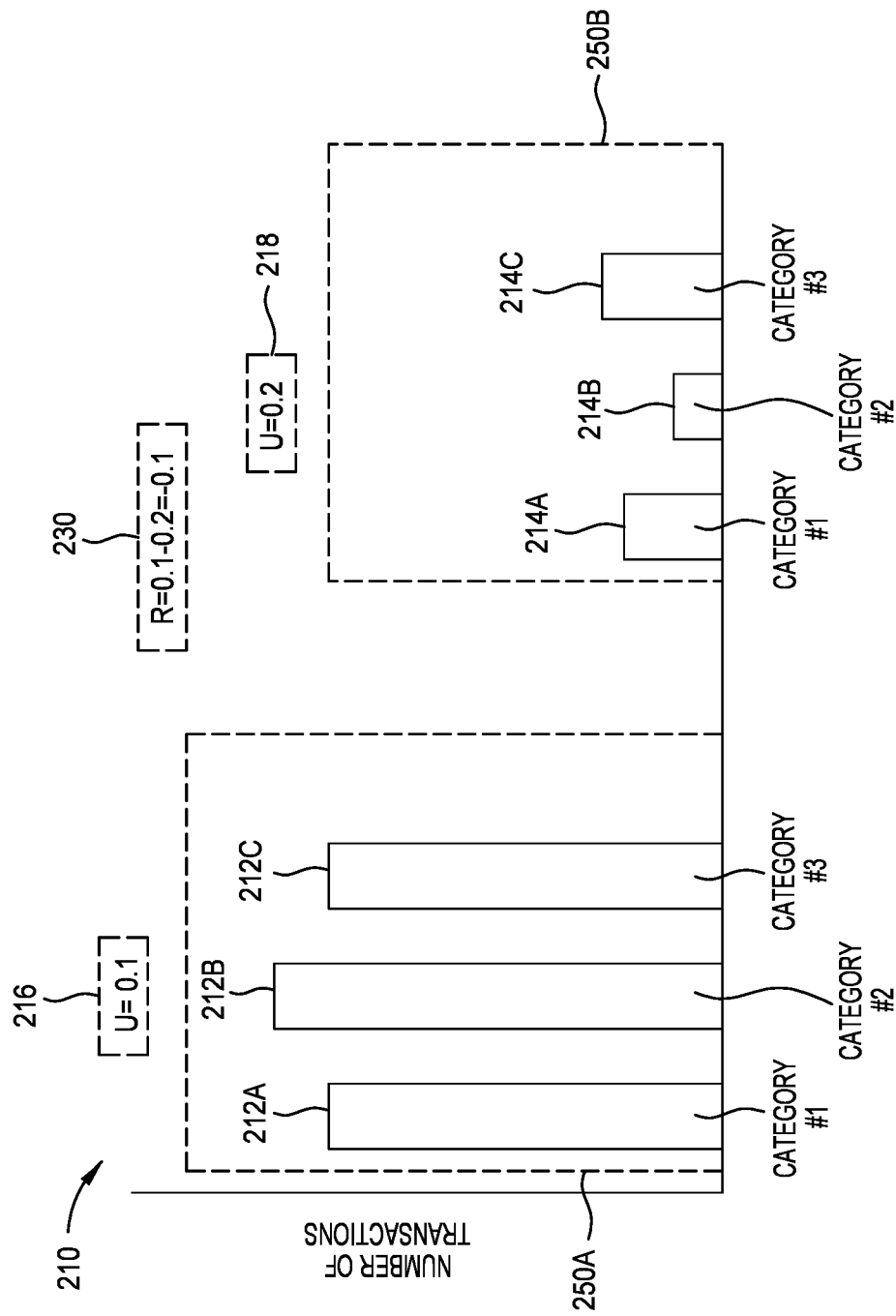

FIGS. 2A and 2B depict distributions 200 and 210 for two rules, implemented to categorize a set of transactions (e.g., a set of transactions received from database 104 of FIG. 1). In some cases, a server, such as server 102 of FIG. 1, may implement the rules.

Generally, a categorical distribution may depict a number of transactions that have been categorized based on a rule (e.g., a rule built by rule builder 110 of FIG. 1 based on a rule definition). The categorical distribution may include one or more categories (e.g., "Category #1", "Category #2", or "Category #3") in which the transactions could be placed. In some embodiments, each category may be associated with an account held by a user that may have defined the rule, and all transactions placed into a category may be placed in the account associated with that category.

Additionally, a categorical distribution may be associated with a type, such as "matched" or "unmatched", where a matched categorical distribution would only contain transactions that "matched" the implemented rule and an unmatched categorical distribution would only contain transactions that did not "match" the implemented rule. In order to determine which rules matched or did not match the rule, the server may analyze transaction descriptions associated with each transaction based on the rule.

The transaction descriptions may be analyzed in a variety of ways based on how the rule is defined. In the depicted examples of FIGS. 2A and 2B, transactions are analyzed based on a rule. For example, if a first text string is present in a transaction description, the associated transaction will be placed in category #1, while if a second text string is present in a transaction description, the associated transaction will be placed in category #2, and if a third text is present in a transaction description, the associated transaction will be placed in category #3. In addition, if none of the text strings are present in the transaction description of a particular transaction, the particular transaction may be categorized based on another rule or another process of the server, as described below with respect to FIG. 2B in particular. In other examples, the transactions may be categorized based on amounts associated with the transactions. In another example, the transactions may be categorized based on parties associated with the transactions. While the transactions may be categorized based on the strings, amounts, or parties, as described above, these categorization attributes are exemplary and the transactions may be categorized based on other attributes as well.

In particular, FIG. 2A depicts distribution 200 including both a matched categorical distribution 240a and an unmatched categorical distribution 240b for a rule. The rule may include programming logic for categorizing transactions. For example, the rule may include logic defining that transactions associated with transaction descriptions including the text string "Company Limited" should be placed in category #1, transactions associated with transaction descriptions including the text string "Startup Corp." should be placed in category #2, and transactions associated with transaction descriptions including the text string "Startup Corporation invoice" should be placed in category #3. In other examples, the rule may include logic based on data surrounding the transactions, such as an amount associated with transactions or dates associated with transactions, and may categorize the transactions based on that data.

In this depicted embodiment, the transactions and their associated transaction descriptions are analyzed (e.g., through transaction analyzer 120 of FIG. 1), and can accordingly be categorized based on the rule. For instance, if a transaction description contains one of the text strings as described above, the associated transaction will be considered a matched transaction based on the rule, and will be deposited in the appropriate category. Thus, all transactions included in transactions 202a contain "Company Limited", all transactions in transactions 202b contain "Startup Corp.", and all transactions in transactions 202c include "Startup Corporation invoice". Collectively, all transactions as displayed by transactions 202a, 202b, and 202c make up the matched categorical distribution 240a for the rule associated with distribution 200 because all transactions in transactions 202a, 202b, and 202c were associated with a transaction description that included one of the specified strings.

In this depicted embodiment, some transactions are not associated with transaction descriptions that contain one of the text strings, and thus, do not match the rule. Those unmatched transactions, such as the transactions of transactions 204a, 204b, and 204c, may be categorized based on another process. For example, another rule may be applied to the unmatched transactions in order to categorize them. Thus, all transactions included in transactions 204a, 204b, and 204c do not contain "Company Limited", "Startup Corp.", or "Startup Corporation invoice" in their associated transaction descriptions, and collectively make up the unmatched categorical distribution 240b.

A unity metric may be determined for each categorical distribution associated with a rule. A unity metric may be calculated based on how many transactions are placed in each category. Generally, a unity metric indicates a degree of uniformity of which the transactions were categorized. In some embodiments, the unity metrics may be a numerical value from 0.0 to 1.0 indicating whether the rule effectively categorized matched transactions or unmatched transactions, where higher unity metrics indicate that the rule more effectively categorizes the transactions.

For example, in the matched categorical distribution 240a of distribution 200, the most transactions were placed in category #1, some transactions were placed in category #2, and barely any transactions were placed in category #3. Since most transactions were placed in category #1, the unity metric 206 for the matched categorical distribution 240a will be high, which indicates that most transactions were placed into one category. In this depicted embodiment, a unity metric can be a numeric value from 0.0 to 1.0, and thus, a relatively high unity metric of 0.8 indicates that the server was able to place most of the transactions into one category based on the rule. In other embodiments, the unity metric may be a numeric value within a different range, or may be based on a separate scoring system. Consequently, since a fairly even amount of transactions were placed in categories #1, #2, and #3 in the unmatched categorical distribution 240b of distribution 200, the unity metric 208 for the unmatched categorical distribution 240b is relatively low at 0.3.

In one embodiment, the unmatched categorical distribution 240b may have no transactions placed in any categories because all transactions matched the rule. In that case, the unity metric for the unmatched categorical distribution 240b would be 0.0. In other embodiments, if the number of transactions was evenly distributed across all categories, the unity metric would be zero, while if all transactions were placed in only one category, the unity metric would be 1.0.

In some embodiments, when there is at least one matched transaction and at least one unmatched transaction, a final reliability metric may be determined based on the unity metrics 206 and 208, to determine the effectiveness of the rule, as further described with respect to FIG. 3. The reliability metric may indicate whether the server is able to effectively categorize the transactions based on the rule. For example, if all or a significant portion of the matched transactions are placed in one category while the unmatched transactions are distributed evenly, leading to a high unity metric for the matched categorical distribution 240a and a low unity metric for the unmatched categorical distribution 240b, the rule might receive a high reliability metric based on the difference between the two unity metrics.

A reliability metric indicates the overall effectiveness of the rule. In one embodiment, the reliability metric may be a numerical value from −1.0 to 1.0, where a reliability metric of 1.0 would indicate a very effective rule and a reliability metric of −1.0 would indicate a minimally effective rule. In other embodiments, the reliability metric may be a numeric value that is not bounded by any ranges.

In this depicted embodiments of FIGS. 2A, the reliability metric 220 is calculated as the difference of the unity metric 206 for the matched categorical distribution 240a and the unity metric 208 for the unmatched categorical distribution 240b, leading to a value of 0.5. In another embodiment, the reliability metric may the ratio of the amount of matched transactions for one category and the amount of unmatched transactions for the same category (e.g., the ratio of the number of transactions for 202a and the number of transactions for 204a).

The reliability metric may further be provided to indicate the effectiveness of the rule so that the rule may be accepted and implemented, discarded, or edited. In addition, the unity metrics may also be provided to provide extra insight regarding how the matched transactions and the unmatched transactions were characterized. Further, feedback associated with the reliability metric, the unity metrics, the categorical distribution, and the rule may further be provided.

FIG. 2B depicts distribution 210 including both a matched categorical distribution 250a and an unmatched categorical distribution 250b for another rule. The rule may include programmable logic for categorizing transactions. For example, the rule may include code defining that transactions associated with transaction descriptions including the text string "Company Limited" should be placed in category #1, transactions associated with transaction descriptions including the text string "Co. Ltd." should be placed in category #2, and transactions associated with transaction descriptions including the text string "ltd." should be placed in category #3.

As similarly described with respect to FIG. 2A, the transactions are analyzed and their associated transaction descriptions (e.g., through transaction analyzer 120 of FIG. 1), and can accordingly be categorized based on the rule. Thus, the matched categorical distribution 250a and unmatched categorical distribution 250b of distribution 210 may be created.

Further, the matched transactions 212a, 212b, and 212c all have a relatively even amount of transactions, thus leading to a relatively low unity metric 216 of 0.1. Additionally, the unmatched transactions 214a, 214b, and 214c all also have a relatively even amount of transactions, leading to a relatively low unity metric 218 of 0.2.

As similarly described with respect to FIG. 2A, a reliability metric 230 may be calculated and provided to another device (e.g., computing device 106 of FIG. 1) along with the unity metrics and feedback surrounding the metrics and the rule.

Example User Interface View of Metrics and Feedback Associated with a Rule

Figure 3A:
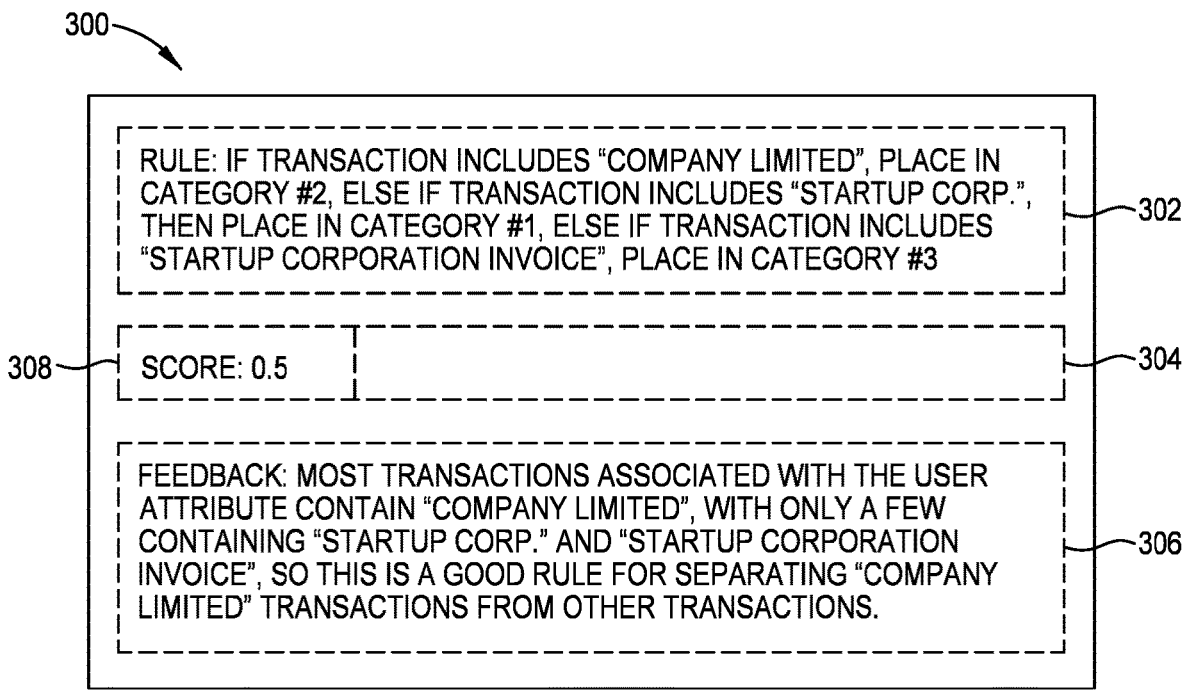
FIGS. 3A and 3B depict example reliability metrics and feedback based on categorical distributions, unity metrics, reliability metrics, and rules.
Figure 3B:
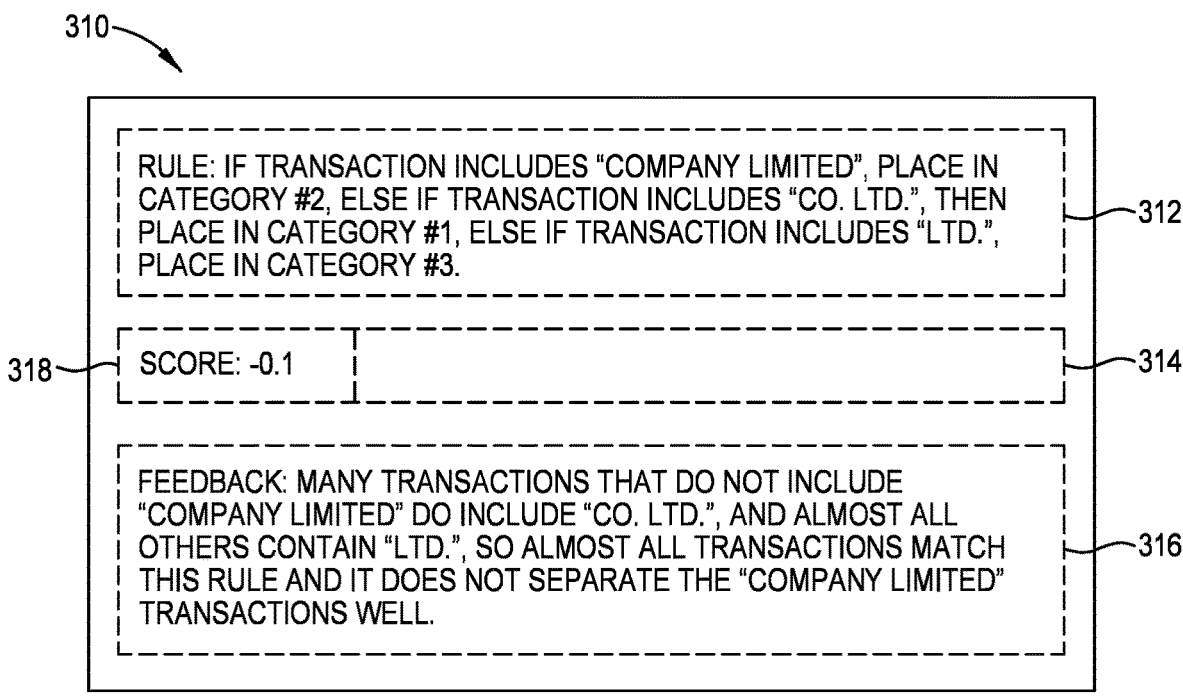

FIGS. 3A and 3B depict example feedback 300 and 310 associated with certain rules (e.g., rules associated with the distributions 200 and 210 of FIGS. 2A and 2B, respectively) based on analysis categorizing a set of transactions. In some embodiments, a server (e.g., server 102 of FIG. 1) may categorize the transactions.

As described with respect to FIGS. 1 and 2A-2B, one or more rules may be received and a set of transactions to categorize based on the one or more rules. As a result of categorizing the set of transactions based on the rule, as well as the resulting distributions and metrics, feedback 300 and 310 may be generated. Each feedback (e.g., 300 or 310) may include one or more portions, such as rule portions 302 or 312, metric portions 304 or 314, and analysis portions 306 or 316.

FIG. 3A further depicts the rule portion 302 of feedback 300 displaying the language of the associated rule (e.g., "If transaction includes 'Company Limited', place in category #2, else if transaction includes 'Startup Corp.', then place in category #1, else if transaction includes 'Startup Corporation invoice', place in category #3.") for viewing via a user interface.

Feedback 300 further displays the reliability metric 308 associated with the rule in metric portion 304. In other embodiments, the metric portion 304 may display other metrics, such as unity metrics for the matched and unmatched categorical distributions (e.g., unity metrics 206 and 208).

Feedback 300 additionally displays feedback determined about the effectiveness of the rule in analysis portion 306. In this depicted example, the feedback in analysis portion 306 indicates that many transaction descriptions of a set of transactions include the text string of "Company Limited", while most of those transaction descriptions do not contain the other defined text strings (e.g., "Startup Corp." and "Startup Corporation Invoice" as defined by rule 302), and thus, the rule reliably separates the transactions associated with "Company Limited" from other transactions that are not associated with "Company Limited".

Thus, after generating feedback 300 associated with the rule, the feedback 300 may be provided to a computing device (e.g., computing device 106 of FIG. 1) so that the rule may or may not be adjusted based on the feedback 300.

FIG. 3B depicts feedback 310 similarly displaying a rule portion 312, a metric portion 314, a reliability metric 318, and an analysis portion 316. As similarly described with respect to FIG. 3A, the rule portion 312 displays the language of an associated rule, while the metric portion 314 displays one or more metrics including the reliability metric 318.

Additionally, analysis portion 316 displays feedback indicating that many transactions descriptions that do not include one text string defined by the rule (e.g., "Company Limited") do include other text strings defined by the rule (e.g., "Co. Ltd." and "ltd."), leading to the transactions of the set of transactions to be distributed evenly. Thus, the feedback of analysis portion 316 further provides that the rule does not separate "Company Limited" transactions from other transactions of the set very well because the other defined text strings of "Co. Ltd." and "ltd." cause almost all transactions to match the rule anyway. In some embodiments, the analysis portion 316 may further recommend that the rule be changed based on the reliability metric. In other embodiments, the analysis portion 316 may further recommend specific changes based on one or more unity metrics associated with the rule (e.g., unity metrics 216 and 218 of FIG. 2).

Thus, after implementing a rule and generating one or more categorical distributions based on that rule, feedback, such as feedback 300 and 310, may be generated and to provided to a computing device associated with the rule.

In some embodiments, one or more extra words associated with one or more text strings defined by the rule may be analyzed. The one or more extra words may be words adjacent to the one or more text strings in the transaction description. For example, in a transaction description of "This invoice is sent to Company Limited on the date of Jul. 2, 2020", where one of the text strings defined by the rule is "Company Limited", the one or more extra words may be "to" and/or "on". The one or more extra words are also not limited to one word adjacent to the text string, and may include more words, phrases, or numbers. In some embodiments, if the one or more extra words appear next to a defined text string in a threshold amount of transactions or above a threshold frequency, the feedback may indicate the one or more extra words should be included in the rule to improve the effectiveness of the rule. In another embodiment, if the one or more extra words appear next to a defined text string in a threshold amount of transactions or above a threshold frequency, the rule may be adjusted based on the one or more extra words and the adjusted rule may be provided to a computing device associated with the rule.

Example Method of Generating Reliability Metrics

Figure 4:
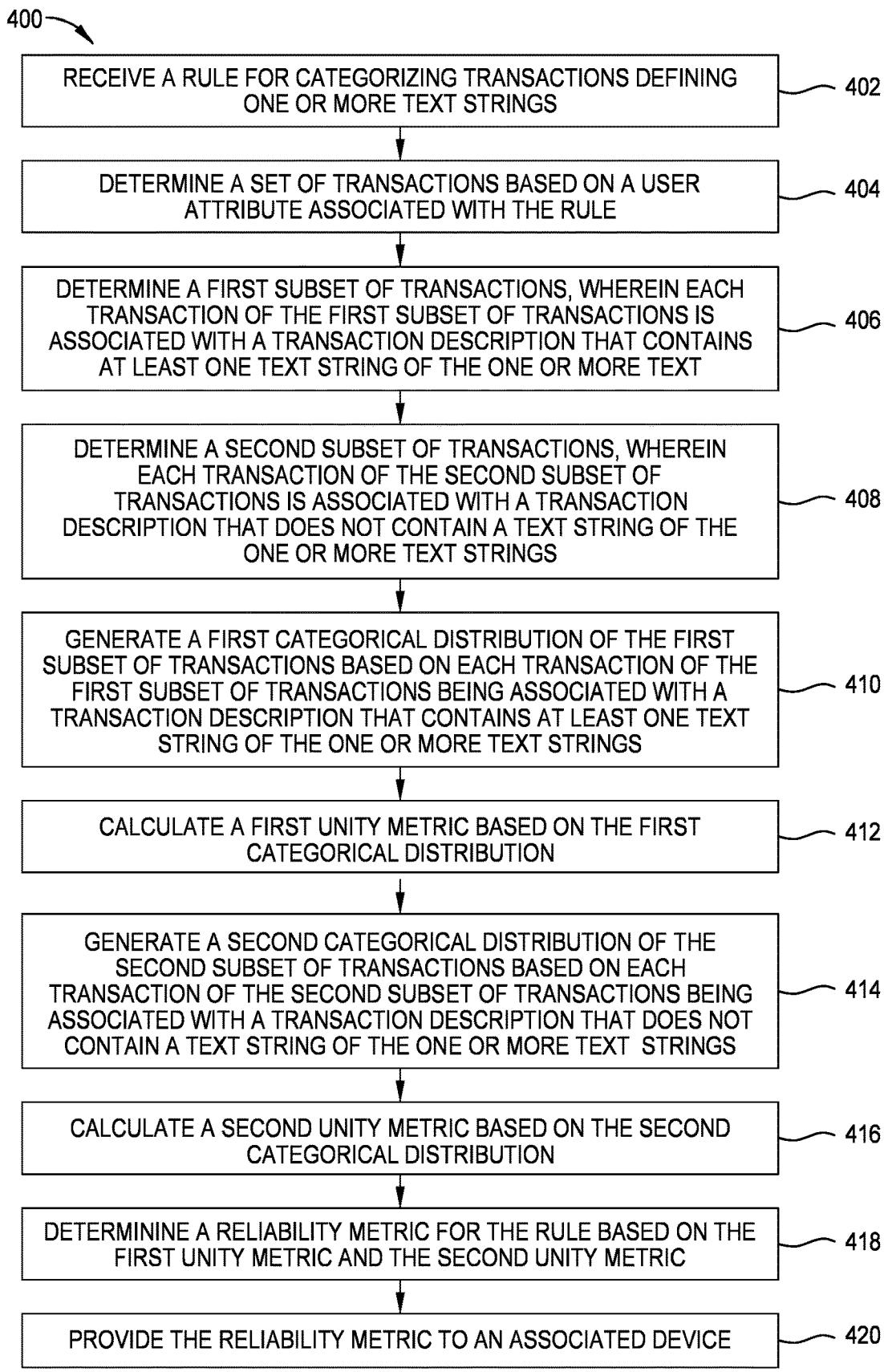
FIG. 4 depicts an example method for generating a reliability metric for a rule.

FIG. 4 depicts an example method 400 of generating a reliability metric (e.g., the reliability metrics 308 and 318 of FIG. 3) based on categorical distributions (e.g., of distributions 200 and 210 of FIG. 2). The method 400 may be performed by a server (e.g., server 102 of FIG. 1), which may receive a set of transactions from an associated database (e.g., database 104 of FIG. 1) or computing device (e.g., computing device 106 of FIG. 1).

Method 400 begins at step 402 with receiving a rule for categorizing transactions. The rule may define one or more characteristics or attributes that may be associated with a set of transactions. For example, the rule may define one or more text strings that may be contained in a transaction descriptions associated with the set of transactions. As another example, the rule may define a transaction amount or a transaction amount limit that may be associated with certain transactions of the set of transactions. As yet another example, the rule may define one or more industries that may be associated with certain transactions of the set of transactions. While the characteristics described above may be defined by the rules, these characteristics are exemplary and other characteristics may be used. The rule may be created based on a rule definition created by a user associated with the rule. The rule may also define a mapping of the text strings to categories that the transactions may be placed in. For example, the mapping may define that if a transaction description contains a first text string of the one or more text strings, the associated transaction should be placed in a first category, but if the transaction description contains a second text string of the one or more text strings, the associated transaction should be placed in a second category.

Method 400 then proceeds to step 404 with determining a set of transactions based on an attribute associated with the rule. For example, the set of transactions may be determined based on a shared attribute, such as an industry name, a geographical location, date, or range of dates. The attribute may be one associated with the user who defined the rule, or may be chosen by the user who defined the rule. In some embodiments, the set of transactions may be chosen from a plurality of transactions, where each transaction of the set of transactions is associated with the attribute and the remaining transactions in the plurality of transactions are not associated with the attribute.

Method 400 then proceeds to step 406 with determining a first subset of transactions. In some embodiments, each transaction in the first subset of transactions "matches" the rule. For example, if the rule defines one or more text strings, each transaction in the determined first subset of transactions would be associated with a transaction description that contained at least one of those defined text strings. As another example, if the rule defined a transaction amount limit, each transaction in the determined first subset of transactions would be associated with transaction amount above the transaction limit, or in other cases, below or equal to the transaction limit. As yet another example, if the rule defined an industry, each transaction in the determined first subset of transactions would be associated with the defined industry.

Method 400 then proceeds to step 408 with determining a second subset of transactions. In some embodiments, each transaction in the second subset of transactions does not "match" the rule. For example, if the rule defines one or more text strings, each transaction in the determined second subset of transactions would be associated with a transaction description that did not contain one of those text strings. As another example, if the rule defined a transaction amount limit, each transaction in the determined second subset of transactions would be associated with transaction amount below the transaction limit. As yet another example, if the rule defined an industry, each transaction in the determined second subset of transactions would not be associated with the defined industry.

Method 400 then proceeds to step 410 with generating a first categorical distribution of the first subset of transactions. The first categorical distribution may be associated with one or more categories that each transaction of the first subset of transactions may be placed in. The first categorical distribution may further display an amount of transactions placed in each one of the categories associated with the categorical distribution. Additionally, the one or more categories may be defined by the rule. Each of the one or more categories may also be associated with an account, where if a transaction of the first set of transactions is placed in a category, the transaction will also be associated with the account associated with the category it is placed in.

Method 400 then proceeds to step 412 with calculating a first unity metric based on the first categorical distribution. The first unity metric may indicate how well the rule categorizes the matched transactions (e.g., the transactions of the first subset of transactions). For example, the unity metric may indicate that the rule categorizes the matched transactions well because the majority of the matched transactions were placed into one category, as opposed to spread evenly or relatively evenly across the categories. The unity metric may further indicate an amount of transactions placed into each category, as well as a difference in the amount of transactions placed into each category. For example, the unity metric may be low if the difference between an amount of transactions placed in a first category and an amount of transactions placed in a second category is small. On the other hand, the unity metric may be high if the difference between an amount of transactions placed in the first category and an amount of transactions placed in a second category is large.

Method 400 then proceeds to step 414 with generating a second categorical distribution of the second subset of transactions. The second categorical distribution may be associated with one or more categories that each transaction of the second subset of transactions may be placed in. In some embodiments, the one or more categories associated with the second categorical distribution may be the same categories associated with the first categorical distribution, which may be associated with the same accounts.

Method 400 then proceeds to step 416 with calculating a second unity metric based on the second categorical distribution. The second unity metric may indicate how the rule categorizes the transactions that do not match the rule (e.g., the transactions of the second subset of transactions). For example, the server may use another rule or another process for categorizing the transactions that did not match the rule, and the second unity metric may indicate that the majority of the transactions that did not match the rule were placed into one category or how they were otherwise spread across the categories.

Method 400 then proceeds to step 418 with determining a reliability metric. In some embodiments, the reliability metric may be based on the first and second unity metrics. In other embodiments, the reliability metric may be calculated based on an amount of matched transactions placed in a first category and an amount of unmatched transactions placed in the first category. For example, the reliability metric may be a ratio of an amount of matched transactions placed in the first category to an amount of unmatched transactions placed in the first category. The reliability metric may be a numerical value indicating how well the rule categorizes the transactions. In other embodiments, the reliability metric may be a word associated with how well the rule categorizes the transactions. In some embodiments, the reliability metric may be associated with feedback indicating how well the rule categorizes the transaction and how the rule may be improved upon or adjusted.

Method 400 then proceeds to step 420 with providing the reliability metric associated with the rule. In some cases, the reliability metric is provided to a device of a user associated with the rule. In some embodiments, the user who is provided the reliability metric is the same user who defined the rule. After receiving the reliability metric, the user may implement the rule or adjust the rule based on the indications provided by the reliability metric. The feedback associated with the reliability metric may also be provided with the reliability metric.

If the user decides to implement the rule, an acceptance of the rule may be received by server. Thereafter, when the server receives one or more new transactions, it may implement the rule and categorize the one or more new transactions based on the rule.

In some cases, one or more extra words may be analyzed in each transaction description based on the one or more text strings. For example, the one or more extra words may be the words adjacent to the text string. Thus, in a transaction description of "This invoice is sent to Company Limited on the date of Jul. 2, 2020", where one of the text strings defined by the rule is "Company Limited", the one or more extra words may be "to" and/or "on". The one or more extra words are also not limited to one word adjacent to the text string, and may include extra words or phrases. Further, the one or more extra words may be analyzed to determine how often the one or more extra words or phrases appear with the defined text string. In some embodiments, if the frequency of the one or more extra words appearing with the defined text string is above a threshold, the feedback that may be provided with the reliability metric may indicate that the rule should be adjusted to include the one or more extra words. In other embodiments, if the frequency is above the threshold, the server may adjust the rule and provide the adjusted rule to the user.

In addition, the server may remove personally identifiable information from the transaction description of each transaction. Personally identifiable information includes information that may be specific to one or a few users, such as a social security number, a telephone number, or an individual's name. The personally identifiable information may be removed before the transactions are analyzed in order to improve the analysis.

Example Processing Device

Figure 5:
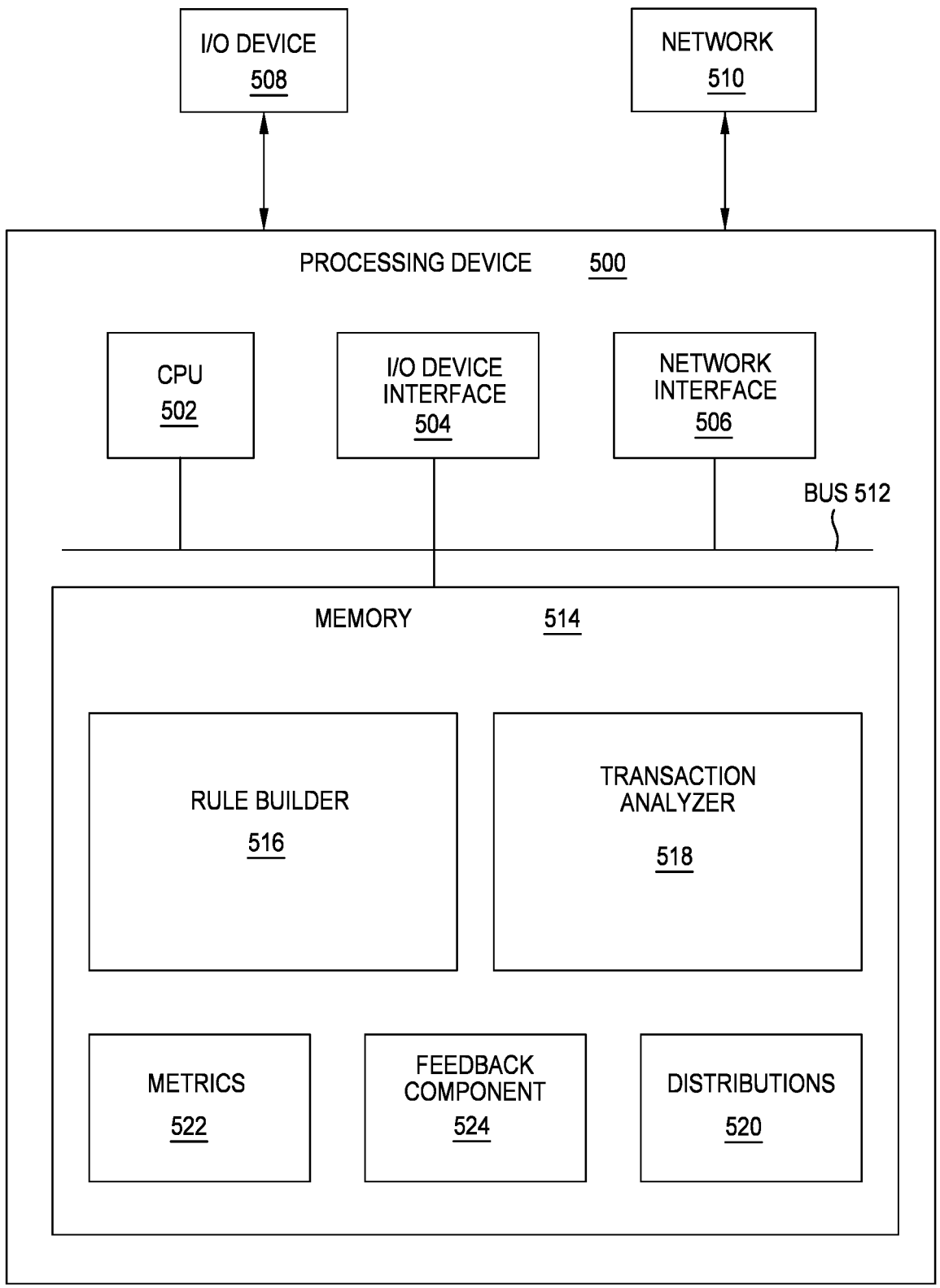
FIG. 5 depicts an example processing device that may be configured to perform the methods described herein.

FIG. 5 depicts an example processing device 500 that may be configured to perform the methods described herein, such as method 400 described with respect to FIG. 4. In various embodiments, the processing device 500 can be a physical processing device, while in other embodiments, the processing device may be a virtual (e.g., cloud) processing device (e.g., a virtual machine operating in a cloud service infrastructure).

In this example, processing device 500 includes a central processing unit (CPU) 502 connected to a data bus 512. CPU 502 is configured to process computer-executable instructions, e.g., stored in memory 514, and to cause the processing device 500 to perform methods described herein, for example, with respect to FIG. 4. CPU 502 is included to be representative of a single CPU, multiple CPUs, a single CPU having multiple processing cores, and other forms of processing architecture capable of executing computer-executable instructions.

Processing device 500 further includes input/output (I/O) device(s) 508 and I/O device interfaces 504, which allows processing device 500 to interface with input/output devices 508, such as, for example, keyboards, displays, mouse devices, pen input, and other devices that allow for interaction with processing device 500. Note that processing device 500 may connect with external I/O devices through physical and wireless connections (e.g., an external display device).

Processing device 500 further includes a network interface 506, which provides processing device 500 with access to external network 510 and thereby external personal devices, such as computing device 106 of FIG. 1.

Processing device 500 further includes memory 514, which in this example includes rule builder 516, transaction analyzer 518, distributions 520, metrics 522, and feedback component 524. In this depicted embodiment, the rule builder 516 may build a rule to be implemented based on a rule definition associated with the rule. The transaction analyzer 518 may then categorize a set of transactions based on the rule. In some embodiments, categorizing the set of transactions based on the rule includes determining if each transaction in the set of transactions is associated with a transaction description that includes one or more text strings defined by the rule. The transaction analyzer 518 may further create a categorical distribution based on categorizing the rules, and may further generate one or more unity metrics and a reliability metric for the rule. The categorical distributions created by transaction analyzer 518 may be stored in distributions 520 and referenced for future use. Further, the metrics created by transactions analyzer 518 may be stored in metrics 522 and referenced for future use. The feedback component 524 may generate feedback to provide to a user associated with the rule based on the one or more unity metrics and the reliability metric for the rule.

Note that while shown as a single memory 514 in FIG. 5 for simplicity, the various aspects stored in memory 514 may be stored in different physical memories, but all accessible by CPU 502 via internal data connections such as bus 512. While not depicted, other aspects may be included in memory 514.

Example Clauses

Implementation examples are described in the following numbered clauses:

Clause 1: A method, comprising: receiving a rule for categorizing transactions defining one or more text strings; determining a set of transactions based on a user attribute associated with the rule; determining a first subset of transactions, wherein each transaction of the first subset of transactions is associated with a transaction description that contains at least one text string of the one or more text strings; determining a second subset of transactions, wherein each transaction of the second subset of transactions is associated with a transaction description that does not contain a text string of the one or more text strings; generating a first categorical distribution of the first subset of transactions based on each transaction of the first subset of transactions being associated with a transaction description that contains at least one text string of the one or more text strings; calculating a first unity metric based on the first categorical distribution; generating a second categorical distribution of the second subset of transactions based on each transaction of the second subset of transactions being associated with a transaction description that does not contain a text string of the one or more text strings; calculating a second unity metric based on the second categorical distribution; determining a reliability metric for the rule based on the first unity metric and the second unity metric; and providing the reliability metric to an associated device.

Clause 2: The method of Clause 1, further comprising: receiving an acceptance of the rule from the user; receiving one or more new transactions; and implementing the rule for the one or more new transactions based on the acceptance.

Clause 3: The method of any one of Clauses 1-2, further comprising: adding each transaction of the first subset of transactions to one or more accounts associated with the first categorical distribution; and adding each transaction of the second subset of transactions to one or more accounts associated with the second categorical distribution.

Clause 4: The method of any one of Clauses 1-3, wherein, the first unity metric indicates a first difference between amounts of transactions assigned to one or more categories associated with the first categorical distribution; and the second unity metric indicates a second difference between amounts of transactions assigned to one or more categories associated with the second categorical distribution.

Clause 5: The method of any one of Clauses 1-4, wherein determining the reliability metric based on the first unity metric and the second unity metric is based on a difference the first unity metric and the second unity metric.

Clause 6: The method of any one of Clauses 1-5, wherein the determining the reliability metric further comprises: determining a first number of transactions of the first subset of transactions assigned to a first category in the first categorical distribution of the first subset of transactions, wherein the first category is associated with the first categorical distribution and the second categorical distribution; determining a second number of transactions of the second subset of transactions assigned to the first category in the second categorical distribution of the second subset of transactions; and calculating a ratio of the first number of transactions to the second number of transactions, wherein the reliability metric comprises the ratio.

Clause 7: The method of any one of Clauses 1-6, further comprising providing feedback for the rule based on the reliability metric indicating whether the rule requires an adjustment.

Clause 8: The method of any one of Clauses 1-7, wherein: the rule comprises a mapping based on the one or more text strings, and generating the first categorical distribution of the first subset of transactions and generating the second categorical distribution of the second subset of transactions is further based on the mapping.

Clause 9: The method of any one of Clauses 1-8, wherein determining the set of transactions based on the user attribute associated with the rule comprises collecting the set of transactions from a plurality of transactions, wherein: each transaction in the set of transactions is associated with the user attribute, and each transaction in the plurality of transactions that is not in the set of transactions is not associated with the user attribute.

Clause 10: The method of any one of Clauses 1-9, further comprising: retrieving a text string of the one or more text strings from each transaction of the first subset of transactions; retrieving one or more extra words associated with each transaction of the first subset of transactions; determining a correctness of an assigned category for each transaction of the first subset of transactions based on the assigned category and the one or more extra words; and providing the correctness for each transaction to the associated device.

Clause 11: The method of Clause 10, further comprising: adjusting the rule based on the one or more extra words associated with each transaction of the first subset of transactions, wherein the adjusted rule defines an adjusted text string based on the retrieved text string and the one or more extra words associated with each transaction.

Clause 12: The method of any one of Clauses 1-11, further comprising removing personally identifiable information from each transaction of the set of transactions.

Clause 13: The method of Clause 12, wherein removing personally identifiable information from each transaction of the set of transactions comprises: removing at least one type of transaction data from each transaction of the set of transactions; and removing transaction data that is not shared by a threshold amount of transactions.

Clause 14: A processing system, comprising: a memory comprising computer-executable instructions; one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium comprising computer-executable instructions that, when executed by one or more processors of a processing system, cause the processing system to perform a method in accordance with any one of Clauses 1-13.

Clause 17: A computer program product embodied on a computer-readable storage medium comprising code for performing a method in accordance with any one of Clauses 1-13.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated transaction categorization, comprising:
   receiving a rule to be used by a processor for automatically categorizing transactions, the rule defining one or more text strings;
   determining a set of transactions based on a user attribute associated with the rule;
   determining a first subset of transactions, wherein each transaction of the first subset of transactions is associated with a transaction description that contains at least one text string of the one or more text strings;

determining a second subset of transactions, wherein each transaction of the second subset of transactions is associated with a transaction description that does not contain a text string of the one or more text strings;

generating a first categorical distribution of the first subset of transactions based on each transaction of the first subset of transactions being associated with a transaction description that contains at least one text string of the one or more text strings;

calculating a first unity metric based on the first categorical distribution;

generating a second categorical distribution of the second subset of transactions based on each transaction of the second subset of transactions being associated with a transaction description that does not contain a text string of the one or more text strings;

calculating a second unity metric based on the second categorical distribution;

determining a reliability metric for the rule based on the first unity metric and the second unity metric; and implementing the rule based on the reliability metric, wherein the implementing comprises automatically categorizing, by the processor, one or more new transactions using the rule.

2. The method of claim 1, further comprising:
providing the reliability metric to an associated device; and
receiving an acceptance of the rule, wherein the implementing of the rule is based on the acceptance of the rule.

3. The method of claim 1, further comprising:
adding each transaction of the first subset of transactions to one or more accounts associated with the first categorical distribution; and
adding each transaction of the second subset of transactions to one or more accounts associated with the second categorical distribution.

4. The method of claim 1, wherein,
the first unity metric indicates a first difference between amounts of transactions assigned to one or more categories associated with the first categorical distribution; and
the second unity metric indicates a second difference between amounts of transactions assigned to one or more categories associated with the second categorical distribution.

5. The method of claim 1, wherein determining the reliability metric based on the first unity metric and the second unity metric is based on a difference between the first unity metric and the second unity metric.

6. The method of claim 1, wherein the determining the reliability metric further comprises:
determining a first number of transactions of the first subset of transactions assigned to a first category in the first categorical distribution of the first subset of transactions, wherein the first category is associated with the first categorical distribution and the second categorical distribution;
determining a second number of transactions of the second subset of transactions assigned to the first category in the second categorical distribution of the second subset of transactions; and
calculating a ratio of the first number of transactions to the second number of transactions, wherein the reliability metric comprises the ratio.

7. The method of claim 1, further comprising providing feedback for the rule based on the reliability metric indicating whether the rule requires an adjustment.

8. The method of claim 1, wherein:
the rule comprises a mapping based on the one or more text strings, and
generating the first categorical distribution of the first subset of transactions and generating the second categorical distribution of the second subset of transactions is further based on the mapping.

9. The method of claim 1, wherein determining the set of transactions based on the user attribute associated with the rule comprises collecting the set of transactions from a plurality of transactions, wherein:
each transaction in the set of transactions is associated with the user attribute, and
each transaction in the plurality of transactions that is not in the set of transactions is not associated with the user attribute.

10. The method of claim 1, further comprising:
retrieving a text string of the one or more text strings from each transaction of the first subset of transactions;
retrieving one or more extra words associated with each transaction of the first subset of transactions;
determining a correctness of an assigned category for each transaction of the first subset of transactions based on the assigned category and the one or more extra words; and
providing the correctness for each transaction to the an associated device.

11. The method of claim 10, further comprising:
adjusting the rule based on the one or more extra words associated with each transaction of the first subset of transactions,
wherein the adjusted rule defines an adjusted text string based on the retrieved text string and the one or more extra words associated with each transaction.

12. The method of claim 1, further comprising removing personally identifiable information from each transaction of the set of transactions.

13. The method of claim 12, wherein removing personally identifiable information from each transaction of the set of transactions comprises:
removing at least one type of transaction data from each transaction of the set of transactions; and
removing transaction data that is not shared by a threshold amount of transactions.

14. A processing system for automated transaction categorization, comprising:
a memory storing executable instructions; and
a processor configured to execute the executable instructions and cause the processing system to:
receive a rule to be used by the processor for automatically categorizing transactions, the rule defining one or more text strings;
determine a set of transactions based on a user attribute associated with the rule;
determine a first subset of transactions, wherein each transaction of the first subset of transactions is associated with a transaction description that contains at least one text string of the one or more text strings;
determine a second subset of transactions, wherein each transaction of the second subset of transactions is associated with a transaction description that does not contain a text string of the one or more text strings;

generate a first categorical distribution of the first subset of transactions based on each transaction of the first subset of transactions being associated with a transaction description that contains at least one text string of the one or more text strings;

calculate a first unity metric based on the first categorical distribution;

generate a second categorical distribution of the second subset of transactions based on each transaction of the second subset of transactions being associated with a transaction description that does not contain a text string of the one or more text strings;

calculate a second unity metric based on the second categorical distribution;

determine a reliability metric for the rule based on the first unity metric and the second unity metric; and implement the rule based on the reliability metric, wherein the implementing comprises automatically categorizing, by the processor, one or more new transactions using the rule.

15. The processing system of claim 14, wherein the processor is further configured to cause the processing system to:

provide the reliability metric to an associated device; and receive an acceptance of the rule, wherein the implementing of the rule is based on the acceptance of the rule.

16. The processing system of claim 14, wherein the processor is further configured to cause the processing system to:

add each transaction of the first subset of transactions to one or more accounts associated with the first categorical distribution; and add each transaction of the second subset of transactions to one or more accounts associated with the second categorical distribution.

17. The processing system of claim 14, wherein the processor is further configured to cause the processing system to:

determining a first number of transactions of the first subset of transactions assigned to a first category in the first categorical distribution of the first subset of transactions, wherein the first category is associated with the first categorical distribution and the second categorical distribution;

determining a second number of transactions of the second subset of transactions assigned to the first category in the second categorical distribution of the second subset of transactions; and calculating a ratio of the first number of transactions to the second number of transactions, wherein the reliability metric comprises the ratio.

18. The processing system of claim 14, wherein the processor being configured to cause the processing system to determine the set of transactions based on the user attribute associated with the rule comprises the processor being configured to cause the processing system to collect the set of transactions from a plurality of transactions, wherein:

each transaction in the set of transactions is associated with the user attribute, and each transaction in the plurality of transactions that is not in the set of transactions is not associated with the user attribute.

19. The processing system of claim 14, wherein the processor is further configured to cause the processing system to:

retrieve a text string of the one or more text strings from each transaction of the first subset of transactions;

retrieve one or more extra words associated with each transaction of the first subset of transactions;

determine a correctness of an assigned category for each transaction of the first subset of transactions based on the assigned category and the one or more extra words; and provide the correctness for each transaction.

20. A method for automated transaction categorization, comprising:

receiving a rule to be used by a processor for automatically categorizing transactions, the rule defining one or more text strings;

determining a set of transactions based on a user attribute associated with the rule;

determining a first subset of transactions, wherein each transaction of the first subset of transactions is associated with a transaction description that contains at least one text string of the one or more text strings;

determining a second subset of transactions, wherein each transaction of the second subset of transactions is associated with a transaction description that does not contain a text string of the one or more text strings;

generating a first categorical distribution of the first subset of transactions based on each transaction of the first subset of transactions being associated with a transaction description that contains at least one text string of the one or more text strings;

determining a first amount of transactions of the first subset of transactions assigned to a first category associated with the first categorical distribution;

generating a second categorical distribution of the second subset of transactions based on each transaction of the second subset of transactions being associated with a transaction description that does not contain a text string of the one or more text strings, wherein the first category is associated with the second categorical distribution;

determining a second amount of transactions of the second subset of transactions assigned to the first category associated with the second categorical distribution;

calculating a ratio of the first amount of transactions and the second amount of transactions;

determining a reliability metric for the rule based on the ratio; and implementing the rule based on the reliability metric, wherein the implementing comprises automatically categorizing, by the processor, one or more new transactions using the rule.

* * * * *